United States Patent Office 3,655,893
Patented Apr. 11, 1972

3,655,893
CHLORONITROPHENYL ETHERS AS NEMATOCIDES
Delta W. Gier, Laurinburg, N.C., and Daniel M. Wasleski, Kansas City, Mo., assignors to Chemagro Corporation, New York, N.Y.
No Drawing. Filed Oct. 16, 1967, Ser. No. 675,331
Int. Cl. A01n 9/00
U.S. Cl. 424—250                                        2 Claims

ABSTRACT OF THE DISCLOSURE

Compounds of the formula

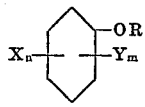

where R is alkyl, cycloalkyl, dihalo triazinyl, quinoxalinyl, alkyl quinoxalinyl, acetonyl, arylketoalkyl, epoxyalkyl, aminoarylketoalkyl, haloarylketoalkyl, X is halogen, Y is nitro, n is an integer of 1 to 3 and m is an integer of 1 to 2 have been found useful as nematocides, herbicides, fungicides and desiccants.

---

The present invention relates to novel pesticides and desiccants.

It is an object of the present invention to develop improved compositions and methods for combatting nematodes.

Another object is to develop improved compositions and methods of combatting fungi.

A further object is to develop improved compositions and methods for killing undesired plants.

Yet another object is to develop improved compositions and methods for desiccating plants.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing as nematocides, fungicides, herbicides or desiccants compounds having one of the following formulae

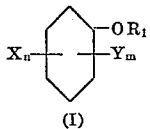     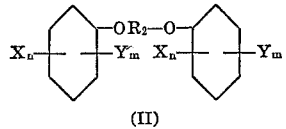

(I)                   (II)

where $R_1$ is lower alkyl, cycloalkyl, dihalo triazinyl, quinoxalinyl, lower alkyl quinoxalinyl, acetonyl, arylketoalkyl, epoxyalkyl, aminoarylketoalkyl, haloarylketoalkyl, alkyl or aryl; $R_2$ is

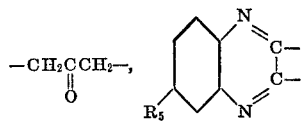

where $R_5$ is hydrogen or lower alkyl, X is halogen, Y is nitro, n is an integer of 1 to 3 and m is an integer of 1 to 2.

The compounds of the present invention are prepared by reacting 1 mole of the appropriate halo nitrophenol with the stoichiometric amount of the appropriate halide, i.e. 1 mole of the halide except when a bis chloronitrophenyl compound is to be formed in which case only 0.5 mole of a dihalide is used per mole of chloronitrophenol. The reaction is carried out in the presence of a base, e.g. sodium hydroxide, potassium hydroxide or the like in the presence of an inert solvent, e.g. dimethoxyethane (ethylene glycol dimethyl ether) or acetone.

As the halonitrophenol there can be employed 2,4,5-trichloro-6-nitrophenol,
2,4-dichloro-6-nitrophenol,
2-chloro-6-nitrophenol,
2-nitro-4-chlorophenol,
2,4,6-trichloro-5-nitrophenol,
2,3,4-trichloro-5-nitrophenol,
2-nitro-3,4-dichlorophenol,
3-chloro-4-nitrophenol,
2,4,5-tribromo-6-nitrophenol,
2,4-dibromo-6-nitrophenol,
2,4,5-trifluoro-6-nitrophenol,
2-chloro-4,6-dinitrophenol,
2,3-dichloro-4,6-dinitrophenol.

As the halide for reacting with the chloronitrophenol there can be used methyl chloride, methyl bromide, ethyl chloride, propyl chloride, isopropyl chloride, butyl chloride, sec-butyl chloride, hexyl chloride, cyclohexyl chloride, amyl chloride, octyl chloride, epichlorohydrin, epibromohydrin, 1,3-dichloro-2-oxo-propane (dichloroacetone), α-chloroacetophenone (chloromethyl phenyl ketone), α-bromoacetophenone, p-bromo-α-chloroacetophenone, p-amino-α-aminoacetophenone, p-chloro-α-chloroacetophenone, cyanuric chloride, 2,3-dichloro quinoxaline, 6-methyl-2,3-dichloro quinoxaline, 2-chloro quinoxaline, 2-chloro-6-methyl quinoxaline, 1-chloroacetone.

Examples of compounds useful in the present invention are 2,4,5-trichloro-6-nitrophenyl methyl ether,
2,4,5-trichloro-6-nitrophenyl sec-butyl ether,
2,4,5-trichloro-6-nitrophenyl hexyl ether,
2,4,5-trichloro-6-nitrophenyl cyclohexyl ether,
2,4,5-trichloro-6-nitrophenyl octyl ether,
2,4,5-trichloro-6-nitrophenyl isopropyl ether,
2,4,5-trichloro-6-nitrophenyl ethyl ether,
2,4,5-trichloro-6-nitrophenyl n-propyl ether,
2,4,5-trichloro-6-nitrophenyl hexyl ether,
2,4-dichloro-6-nitrophenyl methyl ether,
2,4-dichloro-6-nitrophenyl sec-butyl ether,
2,4-dichloro-6-nitrophenyl cyclohexyl ether,
2-chloro-4,6-dinitrophenyl ethyl ether,
2-chloro-4-nitrophenyl methyl ether,
2,4,5-tribromo-6-nitrophenyl methyl ether,
2,4-dibromo-6-nitrophenyl cyclohexyl ether,
2,4,5-trichloro-6-nitrophenyl 2′,4′-dichlorotriazinyl ether,
2,4-dichloro-6-nitrophenyl 2′,4′-dichlorotriazinyl ether,
2′,3′-bis (2,4,5-trichloro-6-nitrophenyl)-6′-methyl quinoxalinyl ether, having the formula

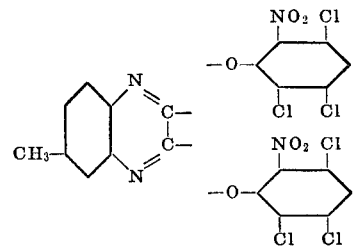

2′,3′-bis (2,4-dichloro-6-nitrophenyl)-6′-methyl quinoxalinyl ether,
2′,3′-bis (2,4,5-trichloro-6-nitrophenyl) quinoxalinyl ether, 2',3'-bis (2,4-dichloro-6-nitrophenyl) quinoxalinyl ether,
2',3'-bis (2,4,6-tribromo-5-nitrophenyl)-6'-methyl quinoxalinyl ether,
2'-(2,4,5-trichloro-6-nitrophenyl)6'-methyl quinoxalinyl ether,
α,w-bis (2,4,5-trichloro-6-nitrophenyl)-2'-oxopropyl ether (prepared from 2,4,5-trichloro-6-nitrophenol and 1,3-dichloroacetone),
α,w-bis (2,4-dichloro-6-nitrophenyl)-2'-oxopropyl ether,
α,w-bis (2-chloro-4,6-dinitrophenyl)-2'-oxopropyl ether,
2,4,5-trichloro-6-nitrophenyl 2'-oxopropyl ether (prepared from 2,4,5-trichloro-6-nitrophenol and monochloroacetone),
2,4,5-trichloro-6-nitrophenyl 2',3'-epoxypropyl ether,
2,4-dichloro-6-nitrophenyl 2',3'-epoxypropyl ether,
2-chloro-4-nitrophenyl 2',3'-epoxypropyl ether,
2,4,5-trichloro-6-nitrophenyl p-bromophenyl-β-oxoethyl ether,
2,4,5-trichloro-6-nitrophenyl p-aminophenyl-β-oxoethyl ether.

The compounds of the present invention can be used alone or they can be applied together with inert solids to form dusts, or can be suspended in a suitable liquid diluent, preferably comprising water.

There can also be added surface active agents or wetting agents and/or inert solids in the liquid formulations. In such case, the active ingredient can be from 0.01 to 95% by weight of the entire composition.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g. ethylene glycol monomethyl ether and diethylene glycol monomethyl ether, alcohols, e.g., ethanol methanol, isopropanol, amyl alcohol, ethylene glycol, propylene glycol, butyl carbitol acetate and glycerine. Mixtures of water and organic solvents, either as solutions or emulsions, can be employed.

The novel compound can also be applied as aerosols, e.g., by dispersing them in air by means of a compressed gas such as dichlorodifluoromethane or trichlorofluoromethane and other Freons, for example.

The compounds of the present invention can also be applied with adjuvants or carriers such as talc, pyrophyllite, synthetic fine silica, attapulgus clay (attaclay), kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

As stated, it is frequently desirable to incorporate a surface active agent in the compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid (di-2-ethylhexyl), ester of sodium sulfosuccinic acid, sodium lauryl sulfate, sodium salt of the sulfonated monoglyceride of coconut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey Red Oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1,000), sorbitan sesquioleate, polyethylene glycol ester of tall oil acids, sodium octyl phenoxyethoxyethyl sulfate, tris (polyoxyethylene) sorbitan monostearate (Tween 60), and sodium dihexyl sulfosuccinate.

The solid and liquid formulations can be prepared by any of the conventional procedures. Thus, the active ingredient in finely divided form if a solid, may be tumbled together with finely divided solid carrier. Alternatively, the active ingredient in liquid form, including solutions, dispersions, emulsions and suspensions thereof, may be admixed with the solid carrier in finely divided form.

The compounds of the present invention can be applied to soil, growing plants, e.g., trees, cotton plants, wheat and other grain plants, vegetable plants, seeds and fabrics.

Unless otherwise indicated, all parts and percentages are by weight.

EXAMPLE I

In preparation the compounds set forth in Table II a solution of 0.1 mole of the appropriate phenol and 10 ml. of 10 molar sodium hydroxide in 200 ml. of dimethoxyethane were placed in a 500 ml. 3-necked round bottom flask with stirrer and condenser. The stoichiometric amount of the appropriate chloride was added and the mixture was refluxed for about 50 hours (40–60 hours can be used). The resulting solution was poured into 300 ml. of chloroform and subsequently washed with two 500 ml. portions of water. After drying over calcium sulfate, the chloroform was removed by means of a rotary evaporator under vacuum leaving the desired ether in fairly high purity. The starting materials are set forth in Table I and the moles of chloride used to react with the 0.1 mole of chloronitrophenol are also indicated. In the left hand column of Table I under "Compound" is indicated the number of the compound prepared as set forth in Table II.

TABLE I

| Compound | Chloronitrophenol | Chloride | Moles |
| --- | --- | --- | --- |
| 1 | 2,4,5-trichloro-6-nitrophenol. | Cyclohexyl chloride | 0.1 |
| 2 | 2,4,5-trichloro-6-nitrophenol. | 2,3-dichloro-6-methyl quinoxaline. | 0.05 |
| 3 | 2,4,5-trichloro-6-nitrophenol. | Cyanuric chloride | 0.1 |
| 4 | 2,4-dichloro-6-nitrophenol. | Methyl chloride | 0.1 |
| 5 | 2,4-dichloro-6-nitrophenol. | 1,3-dichloroacetone | 0.05 |
| 6 | 2,4,5-trichloro-6-nitrophenol. | Methyl chloride | 0.1 |
| 7 | 2,4,5-trichloro-6-nitrophenol. | 1,3-dichloroacetone | 0.05 |
| 8 | 2,4,5-trichloro-6-nitrophenol. | Sec-butyl chloride | 0.1 |
| 9 | 2,4,5-trichloro-6-nitrophenol. | α-chloroacetophenone | 0.1 |
| 10 | 2,4,5-trichloro-6-nitrophenol. | α-Chloro-p-bromoacetophenone. | 0.1 |
| 11 | 2,4,5-trichloro-6-nitrophenol. | α-Chloro-p-aminoacetophenone. | 0.1 |
| 12 | 2,4,5-trichloro-6-nitrophenol. | Ethyl chloride | 0.1 |
| 13 | 2,4,5-trichloro-6-nitrophenol. | n-Propyl chloride | 0.1 |
| 14 | 2,4,5-trichloro-6-nitrophenol. | Isopropyl chloride | 0.1 |
| 15 | 2,4,5-trichloro-6-nitrophenol. | Amyl chloride | 0.1 |
| 16 | 2,4,5-trichloro-6-nitrophenol. | Hexyl chloride | 0.1 |

In Table II there are set forth the compounds having the formula $R_6OR_1$ or $R_6OR_2OR_6$ where $R_6$ is 2,4,5-trichloro - 6 - nitrophenyl or 2,4 - dichloro - 6 - nitrophenyl and $R_1$ and $R_2$ as as previously defined. When $R_6$ is stated to be "bis" then the compound has the formula $R_6OR_2OR_6$ and if $R_6$ is not stated to be "bis" the formula is $R_6OR_1$.

TABLE II

| Compound | $R_6$ | $R_1$ or $R_2$ | M.P. (°C.) | $n_D^{20}$ | Yield, percent |
|---|---|---|---|---|---|
| 1 | Trichloronitrophenyl | Cyclohexyl | Liq. | 1.5540 | 66 |
| 2 | Bistrichloronitrophenyl | 6-methyl quinoxalinyl | 105 | | 30 |
| 3 | Trichloronitrophenyl | 2,4-dichlorotrianzyl | 114 | | 75 |
| 4 | Dichloronitrophenyl | Methyl | 54 | | 63 |
| 5 | Bisdichloronitrophenyl | 2-oxopropyl | 58 | | 30 |
| 6 | Trichloronitrophenyl | Methyl | Liq. | 1.5460 | 83 |
| 7 | Bistrichloronitrophenyl | 2-oxopropyl | <50 | | 80 |
| 8 | Trichloronitrophenyl | Sec-butyl | Liq. | 1.5350 | 78 |
| 9 | do | Phenyl-2-oxoethyl | 76 | | 65 |
| 10 | do | p-bromophenyl-2-oxoethyl | 93 | | 59 |
| 11 | do | p-Aminophenyl-2-oxoethyl | 102 | | 76 |
| 12 | do | Ethyl | Liq. | 1.5500 | 76 |
| 13 | do | n-Propyl | Liq. | 1.5440 | 47 |
| 14 | do | Isopropyl | Liq. | 1.5505 | 43 |
| 15 | do | n-Amyl | Liq. | 1.5345 | 54 |
| 16 | do | n-Hexyl | Liq. | 1.5280 | 64 |

The compounds of the present invention in many instances were applied as wettable powders consisting of 50% of the active ingredient, 46% ultra-fine silica (Hi-Sil), 2% sodium lignin sulfonate and 2% Pluronic L-61 (polyethylene oxide-polypropylene oxide adduct molecular weight about 1000). This wettable powder is hereinafter designated as Formulation A.

EXAMPLE II

The compounds of the present invention are useful as nematocides e.g. against saprophytic nematodes such as Panagrellus and Rhabditis and against parasitic nematodes such as Meliodogyne. The saprophytic nematode tests recorded in Table III were carried out in water as the medium with Panagrellus spp. and Rhabditis spp. at room temperature. The results were recorded as percent kill after a 2-day incubation period. The blank mortality was 0–10% kill. The compounds were tested at the indicated rates in parts per million.

TABLE III

| Compound | 400 p.p.m. | 200 p.p.m. | 25 p.p.m. |
|---|---|---|---|
| 1 | 100 | 100 | 30 |
| 2 | 100 | 100 | 100 |
| 3 | 80 | 80 | 10 |
| 4 | 80 | 80 | 80 |
| 5 | 80 | 80 | 50 |

It can be seen that the 6-methyl quinoxalinyl derivative was particularly effective as a saprophytic nematocide. The compounds of the present invention have low mammalian toxicity, and are non-corrosive.

EXAMPLE III

The compounds of the present invention were tested as pre-emergent and post-emergent herbicides using Formula A at the indicated dosages of active ingredient in lbs./acre. The pre-emergent herbicide results are set forth in Table IV and the post-emergent herbicide results are set forth in Table V. In Table IV a 0–10 scale is employed with 0 indicating 100% germination and 10 indicating no germination. In Table V or 0–10 scale is employed with 0 indicating no kill and 10 indicating 100% kill.

TABLE IV

| Compound | Lbs./acre | Oats | Sugar beets | Radish | Flax | Wheat |
|---|---|---|---|---|---|---|
| 6 | 20 | 3 | 8 | 10 | 8 | 0 |
|   | 10 | 0 | 4 | 6 | 1 | 0 |
| 7 | 20 | 3 | 8 | 8 | 8 | 4 |
|   | 10 | 3 | 8 | 7 | 7 | 3 |
| 5 | 20 | 8 | 9 | 9 | 9 | 2 |
|   | 10 | 2 | 7 | 7 | 7 | 0 |

TABLE V

| Compound | Lbs./acre | Oats | Sugar beets | Radish | Flax | Wheat |
|---|---|---|---|---|---|---|
| 6 | 8 | 6 | 9 | 10 | 10 | 6 |
|   | 2 | 0 | 0 | 4 | 4 | 0 |
| 7 | 8 | 7 | 10 | 10 | 10 | 6 |
|   | 2 | 7 | 10 | 9 | 9 | 6 |
| 5 | 8 | 6 | 10 | 10 | 9 | 4 |
|   | 2 | 5 | 8 | 9 | 9 | 5 |

The compounds, particularly the lower alkyl ethers, showed high selectivity in killing broad leaf plants in preference to narrow leaf plants. The compounds also showed selectivity as pre-emergent herbicides among the narrow leaf plants.

EXAMPLE IV

Formulation A was added to agar cultures of fungi. In Table VI, 10 indicates 100% effectiveness and 0 indicates no effectiveness. The concentrations are expressed in parts per million of active ingredient. In the table for each compound the rate A is 500 p.p.m., rate B is 100 p.p.m. and rate C is 10 p.p.m. The fungi tested were as follows:

Ceratocytis Ulmi _____ CU
Colletotrichum obiculare _____ CO
Fusarium oxysporium _____ FO
Helminthosporium sativium _____ HS
Rhizoctonia solani _____ RS
Verticillium albo-atrum _____ VA

TABLE VI

| Compound | Rate | CU | CO | FO | HS | RS | VA |
|---|---|---|---|---|---|---|---|
| 6 | A | 10 | 10 | 8 | 10 | 10 | 10 |
|   | B | 10 | 10 | 8 | 10 | 0 | 10 |
|   | C | 0 | 0 | 0 | 5 | 0 | 0 |
| 8 | A | 10 | 10 | 10 | 10 | 10 | 5 |
|   | B | 5 | 5 | 5 | 5 | 10 | 0 |
|   | C | 5 | 5 | 5 | 5 | 8 | 0 |
| 7 | A | 10 | 10 | 10 | 10 | 10 | 10 |
|   | B | 10 | 10 | 5 | 10 | 10 | 10 |
|   | C | 5 | 0 | 0 | 5 | 8 | 0 |
| 9 | A | 10 | 10 | 10 | 10 | 10 | 10 |
|   | B | 8 | 10 | 10 | 10 | 10 | 10 |
|   | C | 5 | 10 | 10 | 0 | 10 | 0 |
| 10 | A | 10 | 10 | 10 | 10 | 10 | 10 |
|   | B | 5 | 10 | 10 | 0 | 10 | 0 |
|   | C | 0 | 0 | 5 | 0 | 5 | 0 |
| 11 | A | 10 | 10 | 10 | 10 | 10 | 10 |
|   | B | 5 | 5 | 5 | 0 | 5 | 10 |
|   | C | 0 | 0 | 2 | 0 | 5 | 0 |
| 4 | A | 10 | 10 | 10 | 10 | 10 | 10 |
|   | B | 8 | 8 | 8 | 10 | 10 | 5 |
|   | C | 0 | 0 | 0 | 5 | 0 | 0 |
| 5 | A | 10 | 10 | 10 | 10 | 10 | 10 |
|   | B | 10 | 10 | 10 | 10 | 10 | 0 |
|   | C | 10 | 10 | 8 | 8 | 5 | 0 |

Spore germination tests were carried out as set forth in Table VII. A 1% suspension of the ether in water (10,000 p.p.m) was prepared and there was also prepared a solution of agar in water. The ether suspension was appropriately diluted with water and mixed with the agar solution to give concentrations of ether of 500 p.p.m. (Rate A), 100 p.p.m. (Rate B), 10 p.p.m. (Rate C). 0.3 ml. of the agar material was placed on a microscope slide and a film allowed to form and solidify. Spores of Alternaria spp. (AS) and *Verticillium albo-atrum* (VA) were dusted on the slides and they were placed in Petri dishes with filter paper and incubated at room temperature for 24 hours. The percent of non-germinated spores was recorded as against a control slide of pure agar containing the spores. 100% non-germination is recorded as 10, 80% non-germination is recorded as 8 and so on to 0 for complete germination.

TABLE VII

| Compound | Rate | AS | VA |
|---|---|---|---|
| 6 | A | 10 | 10 |
|   | B | 0  | 0  |
|   | C | 0  | 0  |
| 7 | A | 10 | 10 |
|   | B | 5  | 0  |
|   | C | 0  | 0  |
| 4 | A | 8  | 5  |
|   | B | 0  | 0  |
|   | C | 0  | 0  |
| 5 | A | 10 | 8  |
|   | B | 8  | 8  |
|   | C | 5  | 0  |

The compounds were also tested as soil fungicides. 2 grams of the ether were mixed with an equal weight of attapulgus clay (Attaclay). This mixture was then blended with soil infested with Pythium spp. After blending with the soil, the mixture was allowed to stand for 24 hours. Then the blend was spread evenly over a wet paper towel and 50 pea seeds were placed on the soil. The towels were rolled up and put in metal cans and stored at 40° F. for 5 days and then at 75° F. for 4 days. The cans were then removed and the rate of fungus growth recorded, with 10 indicating no growth (or perfect control), and 0 indicating complete growth (no control). The results are set forth in Table VIII.

TABLE VIII

| Compound | 200 p.p.m. | 50 p.p.m. |
|---|---|---|
| 8 | 7 | 7 |
| 7 | 8 | 7 |
| 9 | 5 | 4 |
| 5 | 8 | 9 |

EXAMPLE V

The compounds of the invention were ineffective as defoliants when tested on cotton but they did show desiccant activity when applied as Formulation A dispersed in water. The results are set forth in Table IX with the rates expressed in lbs./acre.

TABLE IX

| Compound | Rate | Percent desiccation |
|---|---|---|
| 6  | 8 | 40 |
|    | 2 | 30 |
| 12 | 8 | 50 |
|    | 2 | 30 |
| 13 | 8 | 60 |
|    | 2 | 10 |
| 14 | 8 | 60 |
|    | 2 | 60 |
| 8  | 8 | 90 |
|    | 2 | 60 |
| 15 | 8 | 40 |
|    | 2 | 30 |
| 16 | 8 | 60 |
|    | 2 | 30 |
| 1  | 8 | 90 |
|    | 2 | 70 |
| 7  | 8 | 70 |
|    | 2 | 50 |
| 4  | 8 | 10 |
|    | 2 | 10 |
| 5  | 8 | 30 |
|    | 2 | 10 |

For the best desiccant activity there should be a chlorine (or bromine) in the ortho position of the chloronitro phenyl nucleus.

What is claimed is:

1. A process of killing nematodes comprising applying to the nematodes a nematocidally effective amount of a compound having the formula

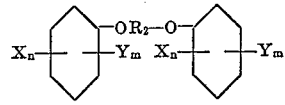

where $R_2$ is

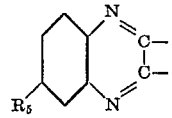

where $R_5$ is hydrogen or lower alkyl, X is chlorine or bromine, Y is nitro, $n$ is 2 to 3 and $m$ is 1.

2. A method according to claim 1 wherein the compound is 2',3'-bis(2,4,5-trichloro-6-nitrophenyl)-6'-methyl quinoxalinyl ether.

References Cited

UNITED STATES PATENTS 3,081,224   3/1963   Thorson et al. _____ 424—340

OTHER REFERENCES

Stedman's Medical Dictionary, 20th ed., Williams & Wilkins Co., Baltimore (1961), pp. 672 and 715.

Encyclopedia Britannica, vol. 16, Encyclopedia Britannica, Inc. (1957), pp. 206–208.

ALBERT T. MEYERS, Primary Examiner

F. E. WADDELL, Assistant Examiner

U.S. Cl. X.R.

71—74; 252—194; 260—250 R; 424—249, 278, 330, 331, 340